United States Patent
Brooks et al.

(10) Patent No.: US 6,847,181 B2
(45) Date of Patent: Jan. 25, 2005

(54) MAGNETICALLY ATTACHED ROBOTIC BREAKAWAY

(75) Inventors: Peter E. Brooks, Rochester, MN (US); Jerome McConnell, Eyota, MN (US)

(73) Assignee: Pemstar, Inc., Rochester, MN (US)

( * ) Notice: Subject to any disclaimer, the term of this patent is extended or adjusted under 35 U.S.C. 154(b) by 171 days.

(21) Appl. No.: 10/210,849

(22) Filed: Aug. 1, 2002

(65) Prior Publication Data

US 2003/0048088 A1 Mar. 13, 2003

Related U.S. Application Data

(60) Provisional application No. 60/311,276, filed on Aug. 9, 2001.

(51) Int. Cl.[7] .............................................. B25J 19/06
(52) U.S. Cl. ................................. 318/568.11; 901/49
(58) Field of Search ........................... 318/560, 568.11, 318/568.16; 901/46, 49

(56) References Cited

U.S. PATENT DOCUMENTS

| | | | |
|---|---|---|---|
| 4,635,238 A | | 1/1987 | Gallagher et al. |
| 4,655,630 A | * | 4/1987 | Rinehart ..................... 403/342 |
| 4,714,865 A | | 12/1987 | Chin et al. |
| 4,860,864 A | | 8/1989 | Cwycyshyn et al. |
| 4,995,493 A | | 2/1991 | Cotsman et al. |
| 5,241,875 A | * | 9/1993 | Kochanneck ............. 74/490.03 |
| 5,372,567 A | | 12/1994 | Whittington et al. |
| 5,523,662 A | * | 6/1996 | Goldenberg et al. ... 318/568.11 |
| 5,771,553 A | | 6/1998 | Sim et al. |
| 5,850,762 A | * | 12/1998 | Kochanneck ............. 74/490.03 |
| 5,954,446 A | | 9/1999 | Ireland |
| 5,993,365 A | | 11/1999 | Stagnitto et al. |
| 6,323,615 B1 | * | 11/2001 | Khairallah ............. 318/568.11 |
| 6,459,227 B2 | * | 10/2002 | Barr ........................ 318/568.1 |

* cited by examiner

Primary Examiner—Bentsu Ro
(74) Attorney, Agent, or Firm—Dorsey & Whitney LLP

(57) ABSTRACT

The subject invention includes a coupling device for coupling a tooling arm to a robotic arm assembly. The coupling device includes a sensing mechanism which monitors relative distances within the coupling device in order to detect displacement in the coupling device. The coupling device also includes an adjustment method for setting the level of force required to execute a breakaway between the items being coupled, while providing a minimum magnetic holding force great enough to assure that robotic arm accelerations and de-accelerations can not cause the inertia or momentum to dislodge the tooling arm from the robotic arm assembly.

18 Claims, 3 Drawing Sheets

MAGNETICALLY ATTACHED ROBOTIC BREAKAWAY

CROSS-REFERENCE TO RELATED APPLICATION(S)

This application claims priority from U.S. Provisional Application No. 60/311,276 entitled "Magnetically Attached Robotic Breakaway," filed on Aug. 9, 2001 the contents of which are hereby incorporated in its entirety.

FIELD OF THE INVENTION

This invention relates generally to a coupling device. More particularly, the invention relates to a robotic arm assembly with a tool arm that is magnetically coupled thereto.

BACKGROUND OF THE INVENTION

Robotic arm assemblies are typically quite sensitive to contact. Seemingly innocuous acts such as colliding with another body, work part, tool or fixture may produce sufficient damage to require repair. Often, the damaged component is an end effector attached to a tooling arm of a robotic system. An end effector is particularly susceptible to breakdowns because it is typically in constant motion, and many of the tasks it performs require such great precision that slight misalignments can produce significant error.

Once a robotic arm assembly is damaged, it is often quite difficult to repair it, resulting in excessive and often expensive down time. Repairing a damaged end effector typically requires the tooling arm to be dismantled from the robotic arm assembly and the end effector rebuilt in a machine shop. Once the end effector is rebuilt, a highly skilled technician is often required to reassemble the tooling arm to the robotic arm assembly, and to realign the end effector so that it performs according to its positional matrices.

The process of reconnecting the tooling arm to the robotic arm assembly typically requires numerous adjustments to account for positional variances caused by reassembly. There are robotic arm assemblies in the prior art which allow a tooling arm to be coupled and uncoupled without complex disassembly. However, most of these robotic arm assemblies are aimed at robotic tooling arms that handle tooling or masses greater than about 10 Kg, and most of these designs are quite mechanically complex. The current designs are typically not effective in protecting tooling and parts less than 1 Kg. Furthermore, many of these designs are not able to detect breakdowns of the end effector.

Also, minor collisions involving a robotic arm or an end effector can cause minor misalignments in the positioning of a tooling arm with respect to the robotic arm assembly. If these minor breakdowns are not detected, the end effector might produce faulty work pieces or it may cause more extensive damage to itself. Consequently, it is also of great importance that a robotic arm assembly sense and provide adequate warning of a misalignment.

Consequently, there is a need for a coupling device that will allow rapid and simple disassembly and assembly of a tooling arm from a robotic arm assembly, without loss of mechanical position of the tooling arm (i.e. no need to readjust the robotic system to account for differences in positioning of the tooling arm). There is also a need for a coupling device which includes a sensing mechanism that can detect a change in the relative position of the items being coupled.

BRIEF SUMMARY OF THE INVENTION

Accordingly, the subject invention presented includes a coupling device presented which allows for easy breakaway and reinstallation of the item being coupled. The coupling device also includes a sensing mechanism which monitors relative distances within the coupling device in order to detect displacement in the coupling device. The coupling device also includes an adjustment method for setting the level of force required to execute a breakaway between the items being coupled, while providing a minimum magnetic holding force great enough to assure that robotic arm accelerations and de-accelerations can not cause the inertia or momentum to dislodge the tooling arm from its mounting block.

In one embodiment, the coupling device includes a magnetically permeable mounting face, which provides an attractive surface for magnetic attachment and a magnetic face. The coupling device also includes complementary locating surfaces that define the orientation of the objects being coupled relative to each other. A plurality of sensors are utilized to monitor the couple between the items being coupled.

In one embodiment, the coupling device is used to couple a tooling arm holding an end effector to a robotic arm assembly. The mounting face is included on a mounting block which is connected to the robotic arm. A magnetic face is included in a mount surface on the robotic tooling arm. Locating surfaces located on the mounting face and mount surface define the orientation of the objects being coupled relative to each other. Thus, the robotic arm and the tooling arm are simply aligned by mating the first and second locating surfaces.

DESCRIPTION OF THE DRAWINGS

For the purpose of facilitating an understanding of the invention, there is illustrated the accompanying drawings, from an inspection of which, when considered in connection with the following description, the invention, its construction and operation, and many of its advantages should be readily understood and appreciated.

DETAILED DESCRIPTION OF THE INVENTION

The subject invention includes a coupling device which is self-locating and which is sensitive to the misalignment of the objects being coupled. For the purposes of illustration only, the coupling device is described herein as being adapted to connect a tooling arm to a robotic arm assembly of a robotic system. As can be readily appreciated by one skilled in the art, the subject invention may be easily adapted to be used for a variety of different coupling applications.

Figure 1:
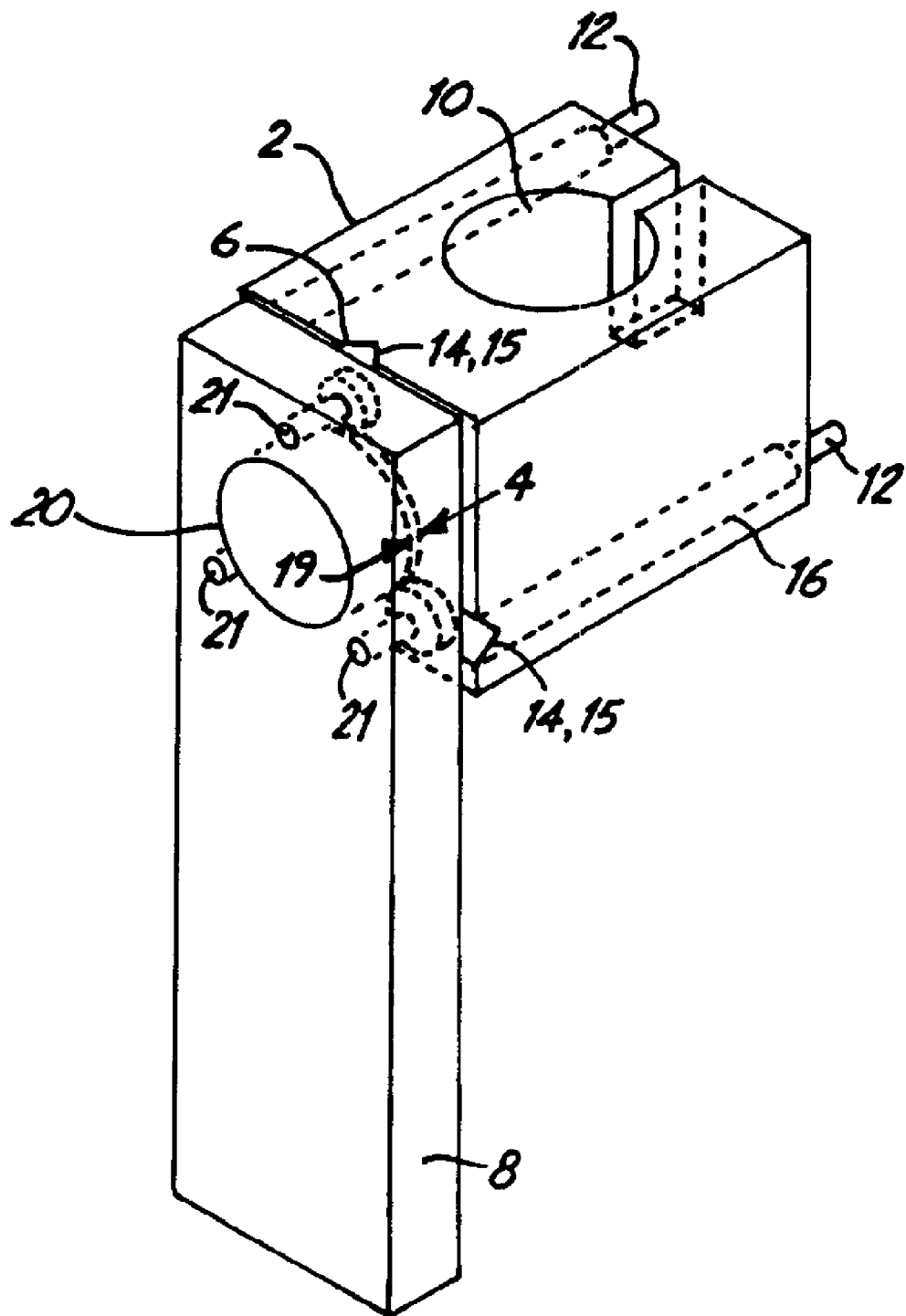
FIG. 1, is a perspective view of one embodiment of the subject coupling device.
Figure 3:
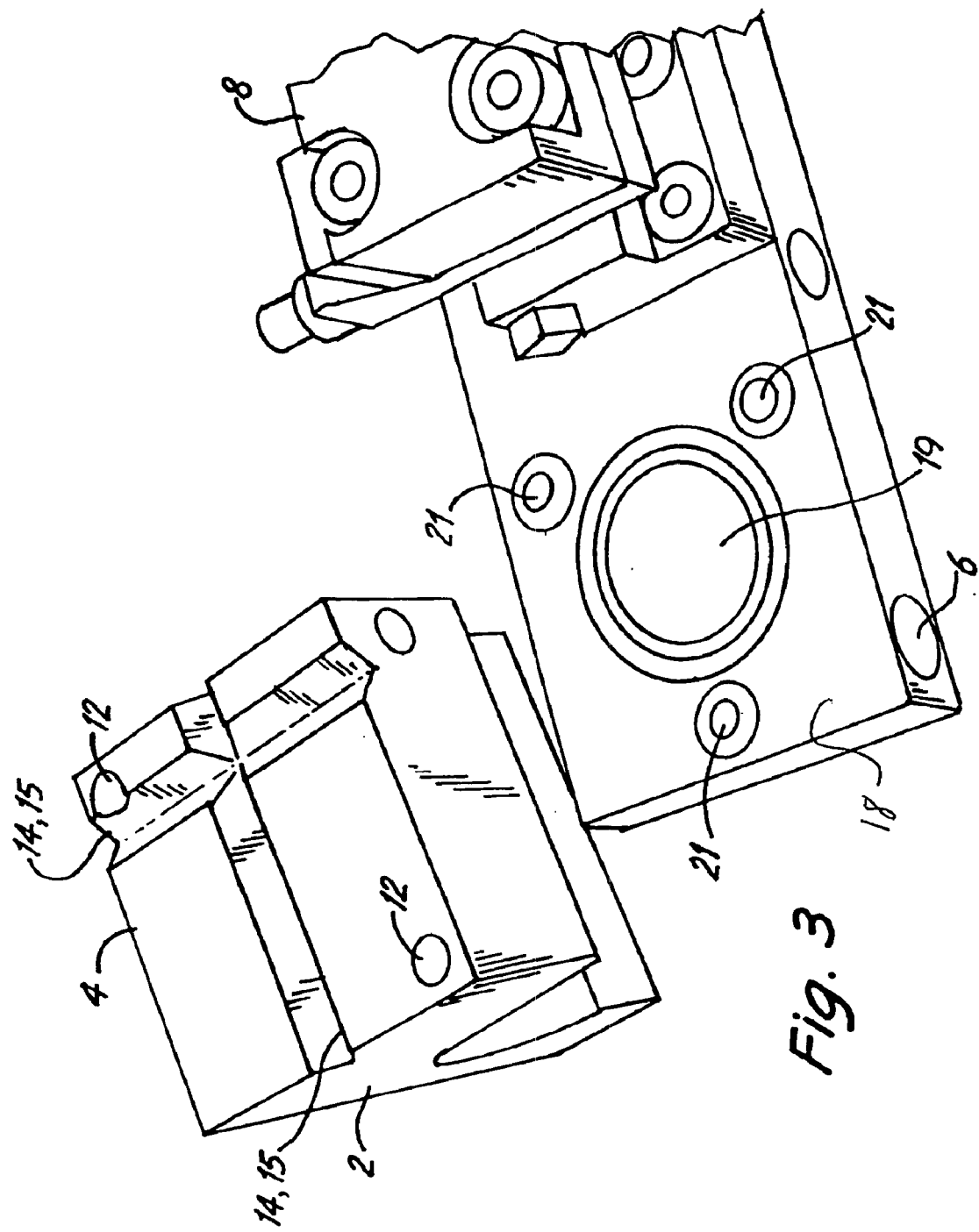
FIG. 3, is a perspective view of the coupling device of FIG. 2 in an uncoupled state.

As shown in FIGS. 1 and 3, in one embodiment, the coupling device includes a mounting block 2 which is attached to a robotic arm. The mounting block 2 includes a magnetically permeable mounting face 4, which provides an attractive surface for magnetic attachment. The mounting block 2 can also include a cylindrical passage 10 for clamping the mounting block 2 to a robotic arm.

Figure 2:
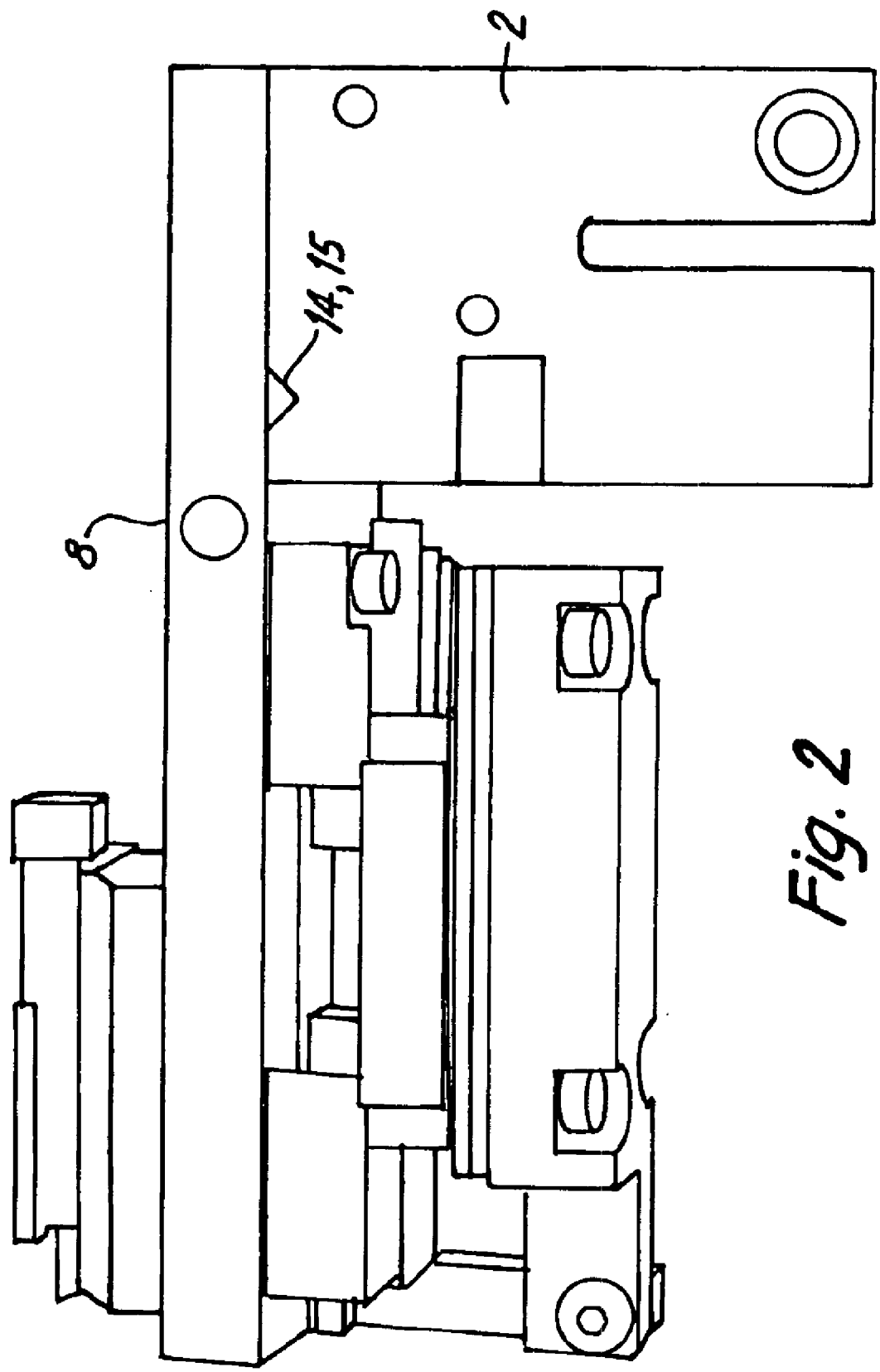
FIG. 2, is an elevated side view of an embodiment of the subject coupling device with the mount block coupled to a tooling arm.

As shown in FIGS. 2 and 3, in one embodiment, the coupling device includes a mount surface 6 which is attached to a tooling arm 8. The mount surface includes a magnetic face 19 comprised of at least one pot magnet 20 held in place by two set screws. The magnetic face 19 is arranged on the robotic tooling arm 8 so that the poles of the pot magnet 20 are oriented generally perpendicular to the mount surface 6.

As shown in FIG. 3, in one embodiment, the coupling device includes complementary locating surfaces on the mounting face 4 and on the mount surface 6. The locating surfaces includes a first locating surface 14 comprised of a pair of mounting grooves 15, preferably vee-grooves orthogonally positioned relative to each other. The mounting grooves provides a female-type, locating surface. The second locating surface 18 is comprised of stemmed tooling balls 21. Each stemmed tooling ball 21 provides a male-type locating surface which mates with the mounting groove 15. The stemmed tooling balls 21 surround the magnetic face 19. As can be readily appreciated by one skilled in the art, other complementary surfaces having different size, shape, orientation, and length can be readily substituted for the first 14 and second 18 locating surfaces shown herein.

The locating surfaces define the orientation of the objects being coupled relative to each other. Thus, the objects being coupled are simply aligned by mating the first and second locating surfaces. As shown in FIG. 3, in one embodiment, the first locating surface, comprising of the mounting grooves 15, are found on the mounting face 4, and the second locating surface, comprising of the stemmed tooling balls 21, extend from the mount surface 6. The mounting grooves 15 and the stemmed tooling balls are positioned to allow them to mate in only one orientation. As such, when the first locating surface 14 mates to the second locating surface 18, the tooling arm 8 is positioned in proper alignment with the robotic arm. As someone skilled in the art can readily appreciate, the first and second surfaces can be readily switched with each other such that the first locating surface can be placed on the mount surface and the second locating surface can extend from the mounting face 4.

As shown in FIG. 1, in one embodiment, a plurality of sensors 12 are utilized to monitor the couple between the mounting block 2 and the mount surface 6. The sensors 12 can be any known in the art which is capable of detecting changes in relative distance between two points. Preferably, the sensors 12 are inductive proximity sensors capable of sensing motion in its sensing field. One such sensor is an Omron E2E CR8 sensor. The inductive proximity sensors are generally in communication with a control system for the robotic arm assembly (not shown). The control system is configured to shut the robot arm motion if a preset degree of displacement is detected by the sensor.

In one embodiment, a pair of sensors 12 are disposed within cavities located at generally opposite locations on the mounting face 4. Such a location enables each sensor to detect relative distance changes between the mounting face 4 and the magnetic face 19. In the event that a load applied at the lower end of a robotic tooling arm 8, which exceeds the ability of the previously established magnetic coupling to hold, one or both of these sensors 12 will detect an increased offset between the magnetic face and the mounting face.

In order to couple the robotic tooling arm 8 to the robotic arm, the magnetic face 19 on the mount surface 6 is positioned to confront the mounting face 4 of the mounting block 2. The tooling arm is then positioned such that the first 14 and second 18 locating surfaces are able to be mated to each other. When the first and second locating surfaces are mated, the mounting face 4 lies adjacent to and confronts the magnetic face 19 enabling a magnetic bond to occur therebetween.

In one embodiment, the attractive force between the magnetic face 19 and the mounting face 4 is defined by the magnet's strength and the gap defined between the two. In practice, the gap is adjusted to provide the desired holding force by changing the distance between the magnetic face 19 relative to the mounting face 4. This is accomplished by changing the position of the pot magnet 20 within the tooling arm 8 relative to the permeable mounting face 4. The set screws retaining the pot magnet 20 are adjusted for positioning the pot magnet 20. This allows the adjustment of the holding force by changing the magnetic gap without changing the physical relationship between the mount surface 6 and the mounting face 4. Similarly the magnetic gap can also be set by utilizing spacers disposed on the mounting block 2 or the mount surface 6.

The magnetic holding force between the magnetic face 19 and the mounting face 4 is adjusted such that it is sufficient to overcome forces attributed to the acceleration or deceleration of the robotic arm, or to any forces attributed to the normal operation of the end effector. A force or moment originating in any direction which is in excess of the preset magnetic holding force will cause the tooling arm to either displace or break away from the robotic arm. Such a force or moment is usually the result of the robotic tooling arm or effector crashing into product or tooling. Upon detection of any motion by the sensors 12, the robotic arm 8 will be shut down and further damage to the robotic arm, tooling arm or effector is avoided.

The magnetic strength of the magnetic face 19 can also be adjusted in order to accommodate the weight of smaller or larger tooling arms. As such the subject invention can be implemented to couple and protect tooling and parts less than 1 Kg in weight. The magnetic strength required is a function of many parameters, for example, the mass of the tooling to be held in place, the desired resistance to decoupling, and the acceleration and deceleration speeds. It is also highly influenced by the fragility of the tooling attached.

While the subject invention has been described with reference to several embodiments thereof, those skilled in the art will recognize various changes that may be made without departing from the spirit and scope of the claimed invention. Accordingly, this invention is not limited to what is shown in the drawings and described in the specification. Any numbering or ordering of elements in the following claims is merely for convenience and is not intended to suggest that the ordering of the elements of the claims has any particular significance.

What is claimed is:

1. A coupling device comprising:
    a mount face defining a magnetically permeable surface and having a first locating surface;
    a mount surface having a magnetic face and a second locating surface complementary to the first locating surface; and
    a sensor for sensing relative distance between the mount face and mount surface.

2. The coupling device of claim 1, wherein a magnetic gap between the magnetic face and the mount face is adjustable.

3. The coupling device of claim 1, wherein the mount surface is located on a robotic tooling arm.

4. The coupling device of claim 1 wherein the mount face is located on a mounting block of a robotic arm.

5. The coupling device of claim 1, wherein the first locating surface includes a groove.

6. The coupling device of claim 5, wherein the second locating surface includes a stemmed tooling ball.

7. The coupling device of claim 6, wherein the sensor includes an inductive proximity sensor.

8. The coupling device of claim 7, wherein a magnetic gap between the mount face and the mount surface is adjustable.

9. A robotic arm assembly comprising:
   a tooling arm having a first mounting surface, the first mounting surface having a mount face defining a magnetically permeable surface and a first locating surface;
   a mounting block having a second mounting surface, wherein the second mounting surface includes a magnetic face and a second locating surface complementary to the first locating surface, the first and second mounting surfaces being coupled to each other; and
   a motion sensor coupled to the mounting block and positioned to detect relative motion in the tooling arm.

10. The assembly of claim 9, wherein the motion sensor triggers a shut-off mechanism for the robotic arm upon detection of motion in the tooling arm.

11. The assembly of claim 10, wherein the first and second locating surface includes, respectively, a V-shaped groove and a stemmed tooling ball.

12. The assembly of claim 11, wherein an attractive force between the first mounting surface and second mounting surface is adjustable.

13. The assembly of claim 9, wherein the motion sensor is an inductive proximity sensor.

14. The assembly of claim 13, wherein the inductive proximity sensor communicates with a shut-off mechanism of a robotic arm assembly.

15. A method of detecting an injury to a tooling arm of a robotic arm assembly comprising:
   providing a tooling arm having a first mounting surface;
   providing a mounting block having a second mounting surface and a motion sensor;
   magnetically coupling the first mounting surface to the second mounting surface; and
   determining if there is relative movement of the first mounting surface with respect to the second mounting surface.

16. The method of claim 15, and further comprising shutting down the robotic arm assembly after relative movement between the first and second mounting surface has been detected.

17. The method of claim 16, and further comprising setting the sensitivity of the robotic arm assembly to an injury by adjusting a magnetic gap between the first and second mounting surfaces.

18. The method of claim 17, and further comprising locating the first mounting surface relative to the second mounting surface.

* * * * *